United States Patent
Wu et al.

(10) Patent No.: US 10,248,179 B2
(45) Date of Patent: Apr. 2, 2019

(54) METHOD AND CONTROLLER FOR POWER THROTTLING UPON SYSTEM ON PORTABLE DEVICE, CORRESPONDING PORTABLE DEVICE, AND CORRESPONDING COMPUTER PROGRAM PRODUCTS

(71) Applicant: MEDIATEK INC., Hsin-Chu (TW)

(72) Inventors: Jui-Chi Wu, Taichung (TW); Chi-Ming Lee, Hsinchu (TW); Tsung-Ju Tsai, Yunlin County (TW)

(73) Assignee: MediaTek Inc., Hsin-Chu (TW)

( * ) Notice: Subject to any disclaimer, the term of this patent is extended or adjusted under 35 U.S.C. 154(b) by 39 days.

(21) Appl. No.: 15/037,684

(22) PCT Filed: Nov. 28, 2014

(86) PCT No.: PCT/CN2014/092475
§ 371 (c)(1),
(2) Date: May 19, 2016

(87) PCT Pub. No.: WO2015/078408
PCT Pub. Date: Jun. 4, 2015

(65) Prior Publication Data
US 2016/0299551 A1    Oct. 13, 2016

Related U.S. Application Data

(60) Provisional application No. 61/910,136, filed on Nov. 29, 2013.

(51) Int. Cl.
*G06F 1/26* (2006.01)
*G06F 1/32* (2006.01)
(Continued)

(52) U.S. Cl.
CPC ............ *G06F 1/3212* (2013.01); *G06F 1/329* (2013.01); *G06F 1/3287* (2013.01);
(Continued)

(58) Field of Classification Search
CPC ...... G06F 1/3212; G06F 1/3287; G06F 1/329; H04W 52/0264; Y02B 60/1282; Y02B 60/1292; Y02B 60/144; Y02B 60/50
See application file for complete search history.

(56) References Cited

U.S. PATENT DOCUMENTS

| 9,864,015 B2 | 1/2018 | Wu et al. |
| 2002/0093311 A1 | 7/2002 | Stryker |

(Continued)

FOREIGN PATENT DOCUMENTS

| CN | 101339214 A | 1/2009 |
| CN | 101349713 A | 1/2009 |

(Continued)

OTHER PUBLICATIONS

"International Search Report" dated Mar. 3, 2015 for International application No. PCT/CN2014/092475, International filed:Nov. 28, 2014.

*Primary Examiner* — Xuxing Chen
(74) *Attorney, Agent, or Firm* — Wolf, Greenfield & Sacks, P.C.

(57) ABSTRACT

A method for power throttling upon a system includes: obtaining at least one characteristic information of a power source that is used for providing energy for the system; and, determining an available power range for the system according to the at least one characteristic information, so as to make the system control a behavior of the system according to the available power range.

24 Claims, 4 Drawing Sheets

(51) Int. Cl.
  *G06F 1/3212*  (2019.01)
  *G06F 1/3287*  (2019.01)
  *G06F 1/329*   (2019.01)
  *H04W 52/02*   (2009.01)

(52) U.S. Cl.
  CPC ..... *H04W 52/0264* (2013.01); *Y02B 60/1282* (2013.01); *Y02B 60/1292* (2013.01); *Y02B 60/144* (2013.01); *Y02B 60/50* (2013.01); *Y02D 10/171* (2018.01); *Y02D 10/174* (2018.01); *Y02D 10/24* (2018.01); *Y02D 70/00* (2018.01)

(56) References Cited

U.S. PATENT DOCUMENTS

| | | |
|---|---|---|
| 2008/0200220 A1 | 8/2008 | Jackson |
| 2008/0201587 A1* | 8/2008 | Lee .................. G06F 1/3203 713/320 |
| 2009/0187780 A1 | 7/2009 | Keohane |
| 2012/0210150 A1 | 8/2012 | de Lind van Wijngaarden |
| 2012/0239949 A1 | 9/2012 | Kalyanasundaram |
| 2013/0254579 A1* | 9/2013 | Derbyshire .......... G06F 1/3212 713/340 |
| 2013/0320880 A1* | 12/2013 | Walker ................ H05B 37/02 315/294 |
| 2016/0299551 A1 | 10/2016 | Wu et al. |

FOREIGN PATENT DOCUMENTS

| | | |
|---|---|---|
| CN | 101611364 A | 12/2009 |
| CN | 101943942 A | 1/2011 |
| CN | 102612655 A | 7/2012 |
| CN | 202383263 A | 8/2012 |
| CN | 102854471 A | 1/2013 |
| CN | 103198543 A | 7/2013 |
| CN | 103199310 A | 7/2013 |
| CN | 203178367 A | 9/2013 |
| CN | 103370969 A | 10/2013 |
| CN | 104977539 A | 10/2015 |
| CN | 105004928 A | 10/2015 |
| EP | 2 403 183 A1 | 1/2012 |
| JP | 2002304239 A | 10/2002 |
| JP | 2003202935 A | 7/2003 |
| JP | 2003295986 A | 10/2003 |
| JP | 2006331107 A | 12/2006 |
| JP | 2009545816 A | 12/2009 |
| JP | 2010507869 A | 3/2010 |
| JP | 2013138455 A | 7/2013 |
| KR | 1020040103991 A | 12/2004 |
| KR | 10-2011-0006266 A | 1/2011 |
| WO | 2012109048 A1 | 8/2012 |

\* cited by examiner

METHOD AND CONTROLLER FOR POWER THROTTLING UPON SYSTEM ON PORTABLE DEVICE, CORRESPONDING PORTABLE DEVICE, AND CORRESPONDING COMPUTER PROGRAM PRODUCTS

CROSS REFERENCE TO RELATED APPLICATIONS

This Application is a National Stage of International Patent Application Serial No. PCT/CN2014/092475, filed Nov. 28, 2014, entitled "METHOD AND CONTROLLER FOR POWER THROTTLING UPON SYSTEM ON PORTABLE DEVICE, CORRESPONDING PORTABLE DEVICE, AND CORRESPONDING COMPUTER PROGRAM PRODUCTS," which claims the benefit of U.S. Provisional Application Ser. No. 61/910,136, filed Nov. 29, 2013, entitled "POWER THROTTLE, the entire contents of which are hereby incorporated by reference"

BACKGROUND

Generally speaking, a conventional scheme may employ a conventional protection circuit to protect a power source such as a battery. The conventional protection circuit may be used for disabling a system operating on a portable device or disabling a system application when the battery temperature is higher than a threshold, so as to achieve protection for the battery. The conventional protection circuit may be used for disabling the system when the battery voltage is lower than a minimum voltage threshold or the residual battery capacity is lower than a minimum capacity threshold, for protecting the battery.

The above-mentioned thresholds are usually configured and fixed for the battery before the battery goes out of the factory. However, characteristic of the battery may be changed after use. Accordingly, it is not appropriate to employ the conventional thresholds mentioned above for protecting the battery all the time. In addition, characteristic of the battery may be varied with other factors that are not considered by the conventional scheme. For precisely protecting the battery, it is not enough to merely consider voltage, battery capacity, or battery temperature.

SUMMARY

Therefore one of the objectives of the present invention is to provide a method, a controller, and a computer program product for dynamically power throttling upon a system operating on a portable device according to characteristic information of a power source, so as to provide the safety for the power source and also improve the system performance and the energy usage efficiency.

Another one of the objectives of the present invention is to provide a portable device and a computer program product for dynamically adjusting a system performance according to characteristic information of a power source, so as to provide the safety for the power source and also improve the system performance and the energy usage efficiency.

According an embodiment of the present invention, a method for power throttling upon a system operating on a portable device is disclosed. The method comprises: obtaining at least one characteristic information of a power source that is used for providing energy for the system; and determining an available power range for the system according to the at least one characteristic information, so as to make the system control a behavior of the system according to the available power range.

According to an embodiment of the present invention, a controller for power throttling upon a system operating on a portable device is disclosed. The controller comprises an acquiring circuit and a determining circuit. The acquiring circuit is used for obtaining at least one characteristic information of a power source that is used for providing energy for the system. The determining circuit is coupled to the acquiring circuit and used for determining an available power range for the system according to the at least one characteristic information so as to make the system control a behavior of the system according to the available power range.

According to an embodiment of the present invention, a computer program product for power throttling upon a system operating on a portable device comprising a computer readable storage medium having computer readable program code embodied therewith is disclosed. The computer readable program code comprising computer readable program code is configured to: obtaining at least one characteristic information of a power source that is used for providing energy for the system; and determining an available power range for the system according to the at least one characteristic information, so as to make the system control a behavior of the system according to the available power range.

According to an embodiment of the present invention, a portable device capable of performing power throttling according to a condition of a power source is disclosed. The portable device comprises a processor. The processor is used for executing program code(s) to dynamically adjust at least one application or to dynamically disable/enable the at least one application according to at least one characteristic information of the power source, so as to dynamically adjust a power ranged provided from the power source.

According to an embodiment of the present invention, a method capable of performing power throttling according to a condition of a power source is disclosed. The method comprises: obtaining at least one characteristic information of the power source; and dynamically adjusting at least one application or dynamically disabling/enabling the at least one application according to the at least one characteristic information of the power source, so as to dynamically adjust a power ranged provided from the power source.

According to an embodiment of the present invention, a computer program product for power throttling upon a system operating on a portable device comprising a computer readable storage medium having computer readable program code embodied therewith is disclosed. The computer readable program code comprising computer readable program code is configured to: obtaining at least one characteristic information of a power source that is used for providing energy for the system; and dynamically adjusting at least one application or dynamically disabling/enabling the at least one application according to the at least one characteristic information of the power source, so as to dynamically adjust a power ranged provided from the power source.

According to embodiments of the present invention, the controller is capable of dynamically determining and updating an available power range for the system operating on the portable device according to characteristic information of a power source, and the system operating on the portable device is capable of adjusting its behavior, application(s), or operation(s) in response to the available power range which is dynamically determined and updated. By doing so, the efficiency of energy usage for the power source can be improved as far as possible under the safety condition of power source, and simultaneously the performance of the system can also be improved as far as possible under the safety condition of power source. Thus, this can guarantee the safety of the power source even though the power source may be implemented by using a battery including a small capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
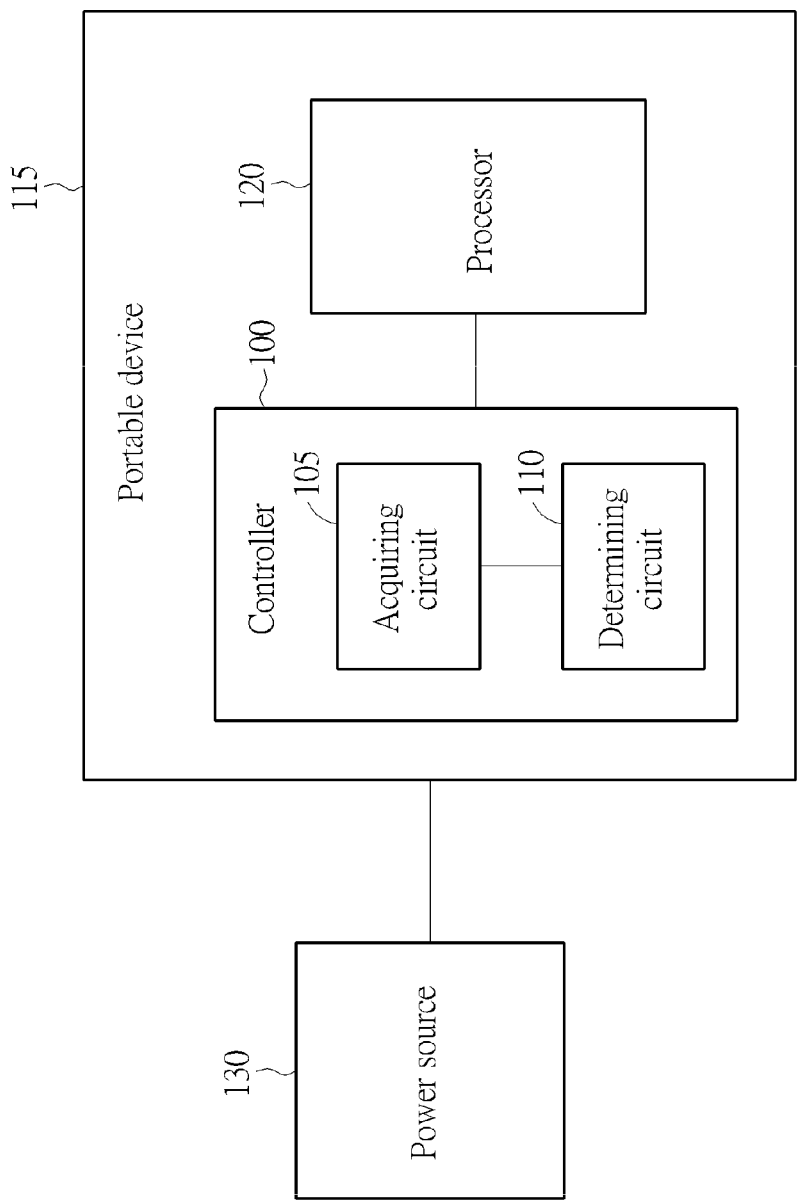
FIG. 1 is a diagram of a controller for power throttling upon a system operating on a portable device according to an embodiment of the present invention.

Please refer to FIG. 1, which is a diagram of a controller 100 for power throttling upon a system according to an embodiment of the present invention. In this embodiment, the operation of power throttling is used for adaptively/dynamically adjusting available power level/range for the system operating on the portable device 115. Especially, this power throttling operation is performed based on the state/characteristic of a power source 130 such as a battery or an adaptor; the battery can be a primary battery cell and/or a secondary battery cell (i.e. rechargeable battery cell). When the state/characteristic of power source 130 becomes different, the system on the portable device 115 is arranged to operate according to the dynamically adjusted power level/range and may adaptively enable/disable at least one application or operation under different conditions. In this embodiment, the processor 120 is responsible to execute, enable, disable, or interrupt software programs/applications of the system. Thus, this can improve the performance of system as far as possible under the safety range of power source 130. It should be noted that the above-mentioned scheme can be used for power throttling a system that does not operate on a portable device. This also falls within the scope of the invention.

Specifically, the controller 100 is arranged to determine an available power range for the system (or the processor 120) initially and immediately or dynamically update the available power range according to characteristic information of the power source 130 so as to make the system (or processor 120) be capable of adaptively employing the appropriate power range to execute programs or applications. The available power range indicates an available power level that can be consumed by the system. That is, the controller 100 is responsible for deciding the available power level for the system to make the system operate under the condition of available power level. According to the available power level, the processor 120 can adaptively disable/enable some applications so that the system can adjust its behavior or operation by itself. In this embodiment, the power source 130 for example comprises a battery and a circuit board connected between the battery and the system. The characteristic information of power source 130 may comprise one kind of state/characteristic of power source 130 or multiple kinds of state/characteristic. For example, the characteristic information may comprise at least one of a voltage of the battery, a current of the battery, a temperature (e.g. environmental temperature) of the power source 130, an inner impedance of the battery, an impedance (e.g. parasitic impedance) of the circuit board, a total capacity of the battery, a residual capacity of the battery, an expansion coefficient of the battery, and protection parameter(s) of the battery, and so on. In a preferred embodiment, the controller 100 is arranged to perform power throttling based on at least all the characteristic information mentioned above so as to precisely improve the performance of system under the safety range of battery. However, this is not intended to be a limitation of the present invention. The controller 100 can also perform power throttling based on at least two kinds of characteristic information. Other different kinds of characteristic information may be referenced by the controller 100.

By dynamically deciding or limiting the available power range for the system operating on the portable device, this effectively avoids that the system overly consumes energy of the battery due to some conditions. For example, the processor 120 may be a multicore processor needing to consume large current. If a small battery (including small capacity) is connected to the portable device 115 for providing a small current for the system, a multicore system without a reference of the available power range may directly shut down since the current provided for the multicore system is not enough. In this embodiment, the multicore system based on the reference of available power range can adjust its behavior or operation adaptively. Thus, the multicore system based on the reference of available power range does not shut down and may temporarily disable or turn off some application/operation that consume large current. In addition, the multicore system without the reference of available power range may suddenly consume over much energy of the small battery to cause the small battery damaged. In this embodiment, the multicore system based on the reference of available power range can prevent the battery from damaged and improve the safety of battery. This can also improve the efficiency of battery usage for the system. For different kinds of power sources (e.g. different kinds of batteries), the method disclosed in the embodiment can make the system on the portable device 115 intelligently adjust its performance according to the different kinds of power sources.

Specifically, as shown in FIG. 1, the controller 100 comprises an acquiring circuit 105 and a determining circuit 110. The acquiring circuit 105 is used for obtaining at least one characteristic information of the power source 130 that is used for providing energy for the system of portable device 115. The acquiring circuit 105 can be arranged to obtain/update the characteristic information by measuring/estimating the power source 130 and/or by receiving the characteristic information from another external data source or the power source 130. For example, the acquiring circuit 105 can receive the protection parameter(s) from the power source 130 such as the battery. In addition, the acquiring circuit 105 can estimate or detect the power source 130 to obtain/calculate the protection parameter(s). In addition, the acquiring circuit 105 can also estimate other kinds of characteristic information such as the inner impedance, the impedance of trace on the circuit board, the voltage, current, temperature, and so on. In addition, for generating expansion coefficient of battery, the acquiring circuit 105 can be implemented by using an expansion sensor for sensing battery deformation to determine whether the battery inflates.

The determining circuit 110 is coupled the acquiring circuit 105 and used for determining or updating the available power range for the system according to the at least one characteristic information, so as to make the system dynamically control its behavior/operation according to the available power range that is dynamically updated. For example, the determining circuit 110 can update the available power range according to the updated characteristic information each time when the battery percentage changes. According to the currently updated available power range, the system (or the processor 120) can adaptively adjust its power consumption. When the currently updated available power range indicates a lower available power level, the system (or the processor 120) may merely enable some applications consuming a lower power level and is not arranged to enable some applications consuming a higher power level. When the currently updated available power range indicates a higher available power level, the system (or the processor 120) may enable the applications consuming the lower power level and the applications consuming the higher power level. Equivalently, the system (or the processor 120) dynamically adjusts the operations or applications based on the updated characteristic information of power source 130.

The available power level is configured to be higher than a maximum power level that can be used by the system to operate. In reality, it is acceptable that the system may suddenly consume more power than the available power level but still lower than the maximum power level. In this situation, when the system consumes over much energy, the battery percentage may rapidly change, and the acquiring circuit 105 immediately updates the characteristic information. The determining circuit 110 immediately makes the system (or the processor 120) adjust at least one operation of system according to the updated characteristic information. For instance, if the system instantaneously consumes over much energy on providing backlight to a display panel of portable device 115, the acquiring circuit 105 is arranged to obtain/generate the updated characteristic information such as residual capacity of battery or inner impedance, and so on. Based on the updated characteristic information, the determining circuit 110 instantaneously determines/updates the available power range/level for the system (or the processor 120) so as to make the system adjust its backlight operation. For example, the determining circuit 110 may decrease the available power range to a smaller power range, and the system based on the smaller power range may reduce its backlight. When the backlight is decreased, the system does not yet consume over much power on providing backlight. Thus, by dynamically/periodically updating the available power range/level, this can prevent the system from continuing consuming over high power level so as to guarantee the safety of power source 130.

The available power range may be configured to include an averagely available power range and an immediately available power range. In addition, the available power range may comprise either the averagely available power range or the immediately available power range. In this embodiment, in order to make the system precisely adjust/control its operation(s) or application(s), a two-stage adjusting is employed. The available power range comprises the averagely available power range and immediately available power range. The averagely available power range indicates an available power level that can be averagely consumed by the system, and the immediately available power range indicates a available power level that can be instantaneously consumed by the system, i.e. an acceptable peak power level. The immediately available power range is configured to be broader than the averagely available power range; that is, the peak power level is configured to be higher than the available power level which can be averagely consumed by the system; however, this is not meant to be a limitation of the present invention. In addition, it should be noted that the acceptable peak power level is not higher than the maximum peak power level that may be provided for the system.

The determining circuit 110 is arranged to determine the averagely available power range and the immediately available power range for the system for making the system decide whether to enable/disable some applications or some operations temporarily by itself. In this embodiment, the averagely available power range and the immediately available power range can be regarded as different power thresholds for alerting the system. For example, when the power level consumed by the system does not exceed above the averagely available power range, the system is not arranged to disable some applications/operations that are currently performed or executed. If the power level consumed by the system exceeds above the averagely available power range but does not exceed above the immediately available power range, in order to gradually decrease the power level consumed by the system to improve safety of battery, the system may be arranged to merely disable some portion of currently performed applications/operations but does not temporarily disable most currently performed applications/operations. If the power level consumed by the system exceeds above the immediately available power range, in order to rapidly decrease the power level consumed by the system to improve safety of battery, the system may temporarily disable most currently performed applications/operations. Thus, by two-stage adjusting for power level, this can maximize the efficiency of power/energy usage for the system under the condition of battery safety. In addition, the determining circuit 110 can be dynamically update and output the averagely available power range and the immediately available power range for the system so that the system can adaptively adjust its behavior, application(s), or operation(s) based on the currently updated state/characteristic of battery.

Figure 2:
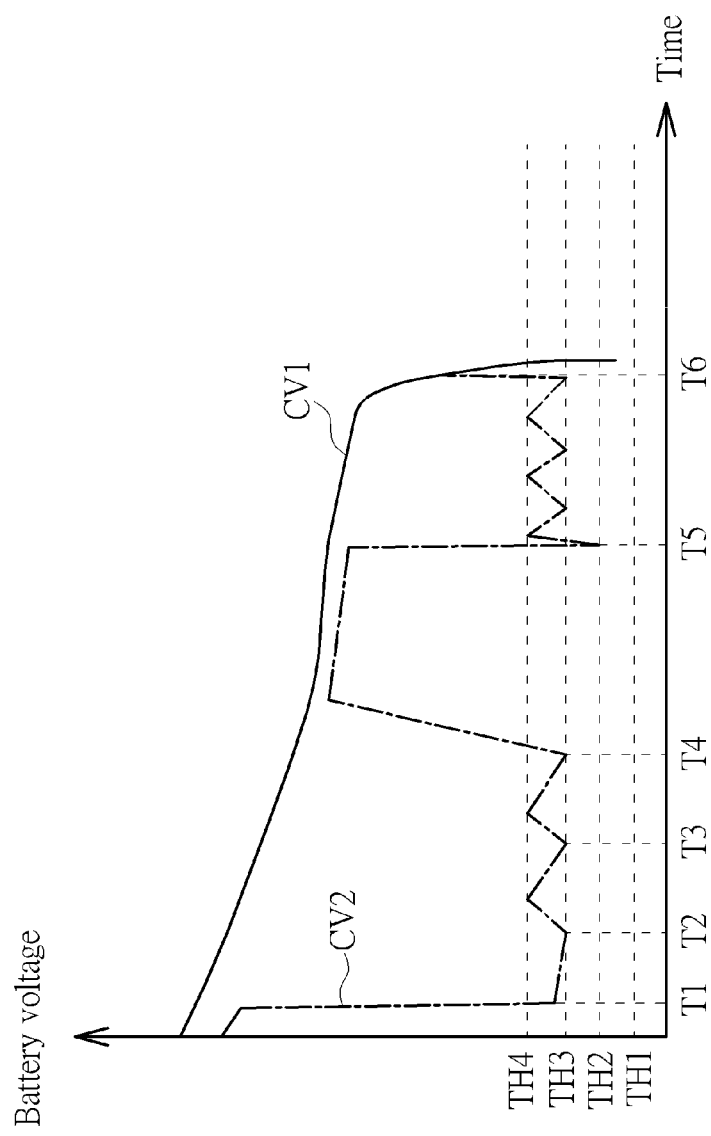
FIG. 2 is a diagram illustrating an example that the system dynamically adjusts its behavior based on the averagely available output voltage drop and the immediately available output voltage drop according to the embodiment of the present invention.

In practice, in this embodiment, the averagely available power range indicates an averagely available output current or a corresponding available output voltage drop that can be averagely accepted by the power source, and the immediately available power range indicates an immediately available output current or a corresponding available output voltage drop that can be immediately accepted by the power source. For example, the determining circuit 110 calculates/updates the averagely available output current and the immediately available output current for the system; in other embodiments, the determining circuit 110 can also calculate/update an averagely available output voltage drop and an immediately available output voltage drop for the system. Please refer to FIG. 2, which is a diagram illustrating an example that the system dynamically adjusts its behavior based on the averagely available output voltage drop and the immediately available output voltage drop according to the embodiment of the present invention. As shown in FIG. 2, curve CV1 indicates the change of residual battery energy percentage with time, and curve CV2 indicates a voltage level of battery actually caused by the operation/application of the system. CV2 shows that the necessary output current actually provided from the battery to the system may change with different applications/operations and the system is arranged to dynamically/adaptively disable or enable some applications/operations so as to extend the lifetime of battery and improve the efficiency of energy usage as far as possible. CV2 indicates that the voltage level changes when the system dynamically enables/disables some applications. TH1 is a voltage threshold indicating a minimum voltage level required by the system to operate. When the system voltage becomes lower than the voltage threshold TH1, the system is arranged to shut down. TH2 is a voltage threshold indicating a level corresponding to the immediately available output voltage drop. TH3 is a voltage threshold indicating a level corresponding to the averagely available output voltage drop.

As shown in FIG. 2, in this example, at timing T1, the actual voltage level becomes lower due to a significant voltage drop on the output voltage of battery caused by a large current provided from the battery. At timing T2, the actual voltage level becomes lower than the voltage threshold TH3, and this indicates that a power level actually consumed by the system exceeds above the averagely available power range. The system initiates an interrupt to temporarily disable some applications or some operations at timing T2. At timings T3 and T4, the actual voltage level becomes lower and reaches the voltage threshold TH3 again, and the system also initiates interrupts to temporarily disable some applications or some operations at timings T3 and T4. In this example, after timing T4, the system becomes idle (background applications are still running) and it is not required for the system to consume a large current from the battery. Accordingly, the actual voltage level of battery becomes higher. When the actual voltage level is higher than a level TH4, the system is arranged to release the above-mentioned interrupt(s). That is, if it is required, the system is allowed to execute the application(s) or operation(s) that consume large currents. At timing T5, the system may enable some application(s) consuming larger currents, and then a significant voltage drop occurs on the actual voltage level of battery. In this example, the significant voltage drop causes the actual voltage level be rapidly decreased and directly reaches the voltage threshold TH2. When the actual voltage level of battery reaches and becomes lower than the voltage threshold TH2, the system is arranged immediately initiate an interrupt to temporarily disable application(s) or operation(s) that is/are currently running and consuming large currents. At timing T6, the system becomes idle again (background applications are still running) and it is not required for the system to consume large currents from the battery. The actual voltage level of battery may become higher than the level TH4, and the system releases the above-mentioned interrupt(s) again. After timing T6, the residual battery capacity may be not enough for basic application(s)/operation(s) of the system, and the system may shut down. Thus, by dynamically determining and updating the averagely available output voltage drop and immediately available output voltage drop, the determining circuit 110 can make the system to dynamically adjust its at least one operation/application to make a first proportion of decrease in the required current amount provided for the system in response to an event of the actual voltage level of battery becoming lower than the voltage threshold TH3 due to that the voltage drop occurring on the actual voltage level becomes higher than the averagely available output voltage drop. In addition, the determining circuit 110 can also make the system to dynamically adjust its at least one operation/application to make a second proportion of decrease in the required current amount provided for the system in response to an event of the actual voltage level of battery becoming lower than the voltage threshold TH2 due to that the voltage drop occurring on the actual voltage level becomes higher than the immediately available output voltage drop. The averagely available output voltage drop corresponds to the averagely available output current, and the immediately available output voltage drop corresponds to the immediately available output current. Equivalently, the determining circuit 110 makes the system to dynamically adjust its at least one operation/application to make the first proportion of decrease in the required current amount provided for the system in response to an event of the actual output current of battery becoming higher than the averagely available output current, and makes the system to dynamically adjust its at least one operation/application to make the second proportion of decrease in the required current amount provided for the system in response to an event of the actual output current of battery becoming higher than the immediately available output current. It should be noted that the first proportion is lower than the second proportion. Additionally, the determining circuit 110 can make the system dynamically adjust its at least one operation/application by enabling a backup power source to provide output current for the system in response to the event of the actual output current of battery becoming higher than the averagely available output current or higher than the immediately available output current.

Figure 3:
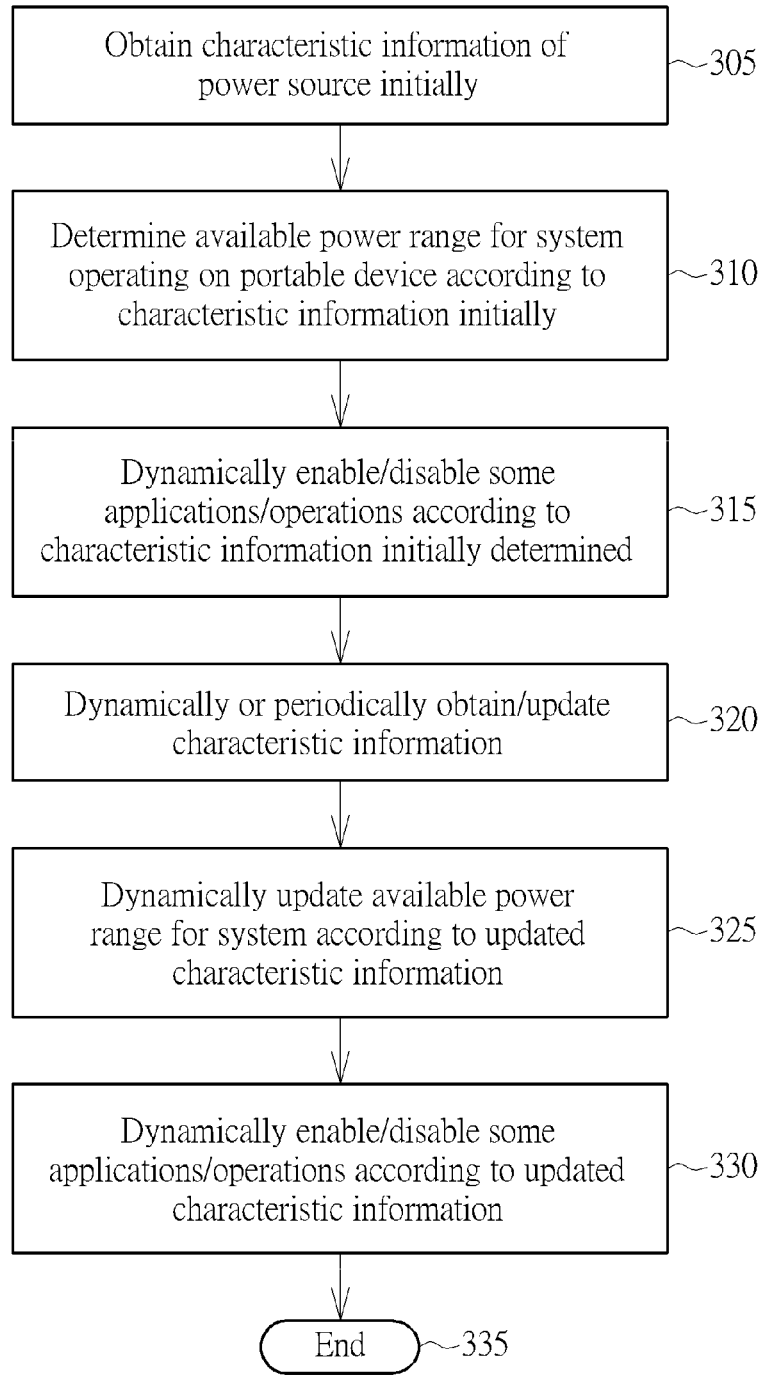
FIG. 3 is a flowchart of the operations of the controller and the system executed by the processor as shown in FIG. 1.

In order to make the reader clearly understand the spirits of the present invention, a flowchart of the operations of the controller 100 and the system executed by the processor 120 as shown in FIG. 1 is disclosed in FIG. 3. Provided that substantially the same result is achieved, the steps of the flowchart shown in FIG. 3 need not be in the exact order shown and need not be contiguous, that is, other steps can be intermediate. The steps of FIG. 3 are detailed in the following:

Step 305: The acquiring circuit 105 obtains characteristic information of the power source 130 when power source 130 is initially connected to the portable device 115;

Step 310: The determining circuit 110 initially determines the available power range for the system operating on the portable device 115 according to the characteristic information;

Step 315: The processor 120 executes program codes to dynamically enable/disable some applications or some operations according to the characteristic information initially determined, so as to adjust the behavior of system adaptively;

Step 320: The acquiring circuit 105 dynamically or periodically obtains characteristic information of the power source 130;

Step 325: The determining circuit 110 dynamically updates the available power range for the system operating on the portable device 115 according to the characteristic information that has been updated dynamically/periodically;

Step 330: The processor 120 executes program codes to dynamically enable/disable some applications or some operations according to the characteristic information updated dynamically/periodically, so as to adjust the behavior of system adaptively; and Step 335: End.

Figure 4:
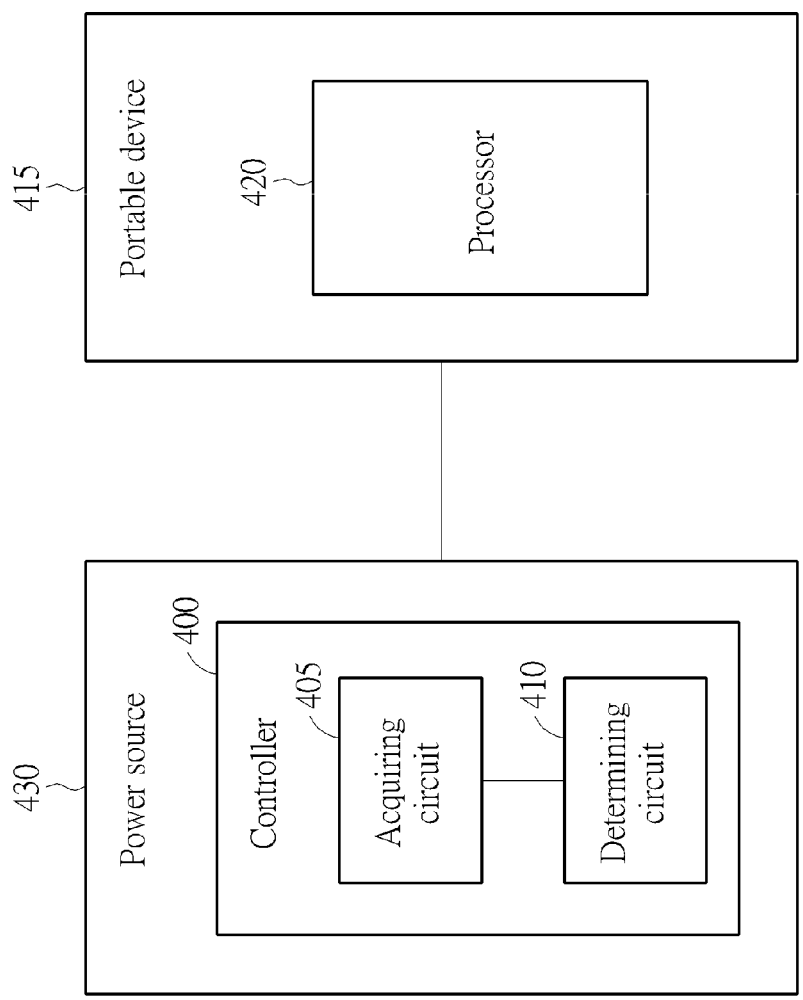
FIG. 4 is a diagram of a controller for power throttling upon a system operating on a portable device according to another embodiment of the present invention.

Further, in the embodiment of FIG. 1, the controller 100 is configured or installed within the portable device 115 such as a mobile phone device or a tablet. In other embodiments, the controller 100 can be configured or installed within a power source such as a battery. FIG. 4 is a diagram of a controller 400 for power throttling upon a system operating on a portable device 415 according to another embodiment of the present invention. As shown in FIG. 4, the controller 400 is configured within the power source 430. For example, the controller 400 can be installed with a protection circuit chip for performing protection upon the power source 430. That is, the controller 400 may be configured to be near to the battery cell of power source 430. This modification also falls within the scope of the present invention. It should be noted that the operations and functions of acquiring circuit 405, determining circuit 410, controller 400, and processor 420 are identical to those of acquiring circuit 105, determining circuit 110, controller 100, and processor 120 as shown in FIG. 1; further description is not described for brevity.

Further, aspects of the present invention may be embodied as a system, method, or computer program product. Accordingly, aspects of the present invention may take the form of an entirely hardware embodiment, an entirely software embodiment (including firmware, resident software, microcode, etc.), or an embodiment combining software and hardware aspects that may all generally be referred to herein as a "circuit," "module" or "system."

Further, aspects of the present invention may take the form of a computer program product embodied in one or more computer readable medium(s) having computer readable program code embodied thereon. For example, in one embodiment, a computer program product for power throttling upon the system operating on the portable device (100 or 400) comprising a computer readable storage medium having computer readable program code embodied therewith is disclosed. The computer readable program code comprising computer readable program code is configured to: obtaining at least one characteristic information of power source (130 or 430) that is used for providing energy for the system; and, determining an available power range for the system according to the at least one characteristic information, so as to make the system control a behavior of the system according to the available power range.

In addition, in another embodiment, a computer program product for power throttling upon the system operating on the portable device (100 or 400) comprising a computer readable storage medium having computer readable program code embodied therewith is disclosed. The computer readable program code comprising computer readable program code is configured to: obtaining at least one characteristic information of the power source (130 or 430) that is used for providing energy for the system; and dynamically adjusting at least one application or dynamically disabling/enabling the at least one application according to the at least one characteristic information of the power source (130 or 430), so as to dynamically adjust a power ranged provided from the power source.

Aspects of the present invention have been discussed above with reference to flowchart illustrations and/or block diagrams of methods, apparatus (systems) and computer program products according to the embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Further, the kind of the power source 130 or 430 is not a limitation of the present invention. All kinds of power sources (including batteries and adaptors) can be applied into embodiments of the present invention. For example, a low cut-off battery can be applied into the embodiments of the present invention. In addition, the power source 130 or 430 may be implemented by using an electrical network/grid. That is, the operation of power throttling can be used for adaptively/dynamically adjusting available power level/range for the system operating on the electrical network/grid. This example also falls within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for power throttling upon a mobile system, comprising:
   obtaining at least one characteristic information of a power source providing energy for the mobile system;
   determining an averagely available power range and immediately available power range for the mobile system according to the at least one characteristic information;
   disabling a first portion of active operations of the mobile system when a power level consumed by the mobile system exceeds the averagely available power range; and
   disabling a second portion of the active operations of the mobile system when the power level consumed by the mobile system exceeds the immediately available power range, the second portion being larger than the first portion.

2. The method of claim 1, wherein the power source comprises a battery and a circuit board connected between the battery and the mobile system; and the at least one characteristic information comprises at least one of a voltage of the battery, a current of the battery, a temperature of the power source, an inner impedance of the battery, an impedance of the circuit board, a total capacity of the battery, a residual capacity of the battery, an expansion coefficient of the battery, and a protection parameter of the battery.

3. The method of claim 1, wherein the step of obtaining the at least one characteristic information comprises obtaining a plurality of characteristic information, and the step of determining the averagely available power range and immediately available power range comprises determining the averagely available power range and immediately available power range according to the plurality of characteristic information.

4. The method of claim 1, further comprising:
   dynamically updating the at least one characteristic information; and
   dynamically adjusting the averagely available power range and immediately available power range for the mobile system according to the updated at least one characteristic.

5. The method of claim 4, wherein the step of determining the averagely available power range and immediately available power range for the mobile system comprises:
   calculating an available output current provided for the mobile system according to the obtained at least one characteristic information, the available output current corresponding to the averagely available power range and immediately available power range; and the step of dynamically adjusting the averagely available power range and immediately available power range for the mobile system comprises:

dynamically adjusting the available output current according to the updated at least one characteristic information.

6. The method of claim 5, wherein the step of calculating the available output current comprises:

calculating an averagely available output current provided for the mobile system according to the obtained at least one characteristic information; and calculating an immediately available output current provided for the mobile system according to the obtained at least one characteristic information.

7. The method of claim 6, wherein the immediately available output current is configured to be higher than the averagely available output current, and the method further comprises:

dynamically adjusting at least one operation of the mobile system to make a first proportion of decrease in an actual output current provided for the mobile system in response to an event of the actual output current becoming higher than the averagely available output current; and dynamically adjusting the at least one operation of the mobile system to make a second proportion of decrease in the actual output current provided for the mobile system in response to an event of the actual output current becoming higher than the immediately available output current;

wherein the first proportion is lower than the second proportion.

8. The method of claim 5, further comprising:

dynamically adjusting at least one operation of the mobile system so as to decrease an actual output current provided for the mobile system in response to an event of the actual output current becoming higher than the available output current.

9. The method of claim 8, further comprising:

dynamically adjusting at least one operation of the system so as to increase the actual output current provided for the mobile system in response to an event of the actual output current becoming lower than the available output current.

10. A controller for power throttling upon a mobile system, comprising:

an acquiring circuit, for obtaining at least one characteristic information of a power source providing energy for the mobile system;

a determining circuit, coupled to the acquiring circuit, for determining an averagely available power range and immediately available power range for the mobile system according to the at least one characteristic information; and a processor for disabling a first portion of active operations of the mobile system when a power level consumed by the mobile system exceeds the averagely available power range and disabling a second portion of the active operations of the mobile system when the power level consumed by the mobile system exceeds the immediately available power range, the second portion being larger than the first portion.

11. The controller of claim 10, wherein the power source comprises a battery and a circuit board connected between the battery and the mobile system; and the at least one characteristic information comprises at least one of a voltage of the battery, a current of the battery, a temperature of the power source, an inner impedance of the battery, an impedance of the circuit board, a total capacity of the battery, a residual capacity of the battery, an expansion coefficient of the battery, and a protection parameter of the battery.

12. The controller of claim 10, wherein the determining circuit is arranged to obtain a plurality of characteristic information and to determine the averagely available power range and immediately available power range according to the plurality of characteristic information.

13. The controller of claim 10, wherein the determining circuit is arranged to dynamically update the at least one characteristic information, and to dynamically adjust the averagely available power range and immediately available power range for the mobile system according to the updated at least one characteristic information.

14. The controller of claim 13, wherein the determining circuit is arranged to calculate an available output current provided for the mobile system according to the obtained at least one characteristic information, and to dynamically adjust the available output current according to the updated at least one characteristic information; and the available output current corresponds to the averagely available power range and immediately available power range.

15. The controller of claim 14, wherein the determining circuit is arranged for:

calculating an averagely available output current provided for the mobile system according to the obtained at least one characteristic information; and calculating an immediately available output current provided for the mobile system according to the obtained at least one characteristic information.

16. The controller of claim 15, wherein the immediately available output current is configured to be higher than the averagely available output current, and the processor dynamically adjusts at least one operation of the mobile system to make a first proportion of decrease in an actual output current provided for the mobile system in response to an event of the actual output current becoming higher than the averagely available output current, and dynamically adjusts the at least one operation of the mobile system to make a second proportion of decrease in the actual output current provided for the mobile system in response to an event of the actual output current becoming higher than the immediately available output current; wherein the first proportion is lower than the second proportion.

17. The controller of claim 14, wherein the processor dynamically adjusts at least one operation of the mobile system so as to decrease an actual output current provided for the mobile system in response to an event of the actual output current becoming higher than the available output current.

18. The controller of claim 17, wherein the processor dynamically adjusts the at least one operation of the mobile system so as to increase the actual output current provided for the mobile system in response to an event of the actual output current becoming lower than the available output current.

19. The controller of claim 10 being configured within the mobile system.

20. The controller of claim 10 being configured within the power source.

21. A non-transitory computer-readable storage medium encoded with a plurality of computer-executable instructions that, when executed by at least one processor, performs a method for power throttling upon a mobile system, the method comprising:

obtaining at least one characteristic information of a power source providing energy for the mobile system;

determining an averagely available power range and immediately available power range for the mobile system according to the at least one characteristic information; and disabling a first portion of active operations of the mobile system when a power level consumed by the mobile system exceeds the averagely available power range; and disabling a second portion of the active operations of the mobile system when the power level consumed by the mobile system exceeds the immediately available power range, the second portion being larger than the first portion.

22. A portable device capable of performing power throttling upon a mobile device, comprising:

an acquiring circuit, for obtaining at least one characteristic information of a power source providing energy for the mobile device;

a determining circuit, coupled to the acquiring circuit, for determining a first threshold voltage corresponding to an averagely available output voltage drop and a second threshold voltage corresponding to immediately available output voltage drop according to the at least one characteristic information; and a processor, for executing program code(s) to:
  initiate a first interrupt to disable a portion of applications or operations of the mobile device when an actual voltage level of the power source becomes lower than the first threshold voltage, and
  initiate a second interrupt to disable a portion of active applications or operations of the mobile device when the actual voltage level of the power source becomes lower than the second threshold voltage.

23. A method for performing power throttling upon a mobile device, comprising:

obtaining at least one characteristic information of a power source providing energy for the mobile system;

determining a first threshold voltage corresponding to an averagely available output voltage drop and a second threshold voltage corresponding to an immediately available output voltage drop according to the at least one characteristic information;

initiating a first interrupt to disable a portion of applications or operations of the mobile device when an actual voltage level of the power source becomes lower than the first threshold voltage; and initiating a second interrupt to disable a portion of active applications or operations of the mobile device when the actual voltage level of the power source becomes lower than the second threshold voltage.

24. A non-transitory computer-readable storage medium encoded with a plurality of computer-executable instructions that, when executed by at least one processor, performs a method for power throttling upon a mobile system, the method comprising:

obtaining at least one characteristic information of a power source providing energy for the mobile system;

determining a first threshold voltage corresponding to an averagely available output voltage drop and a second threshold voltage corresponding to an immediately available voltage output drop according to the at least one characteristic information;

initiating a first interrupt to disable a portion of applications or operations of the mobile device when an actual voltage level of the power source becomes lower than the first threshold voltage; and initiating a second interrupt to disable a portion of active applications or operations of the mobile device when the actual voltage level of the power source becomes lower than the second threshold voltage.

* * * * *